United States Patent [19]
Claar

[11] Patent Number: 5,614,308
[45] Date of Patent: *Mar. 25, 1997

[54] MACROCOMPOSITE BODIES

[75] Inventor: Terry D. Claar, Newark, Del.

[73] Assignee: Lanxide Technology Company, LP, Newark, Del.

[ * ] Notice: The term of this patent shall not extend beyond the expiration date of Pat. No. 5,104,029.

[21] Appl. No.: 352,983

[22] Filed: Dec. 9, 1994

Related U.S. Application Data

[63] Continuation of Ser. No. 867,847, Apr. 13, 1992, abandoned, which is a continuation of Ser. No. 551,290, Jul. 12, 1990, Pat. No. 5,104,029, which is a continuation-in-part of Ser. No. 296,837, Jan. 13, 1989, abandoned.

[51] Int. Cl.$^6$ ................................................ B32B 15/04
[52] U.S. Cl. ............................ 428/312.6; 428/312.8; 428/319.1; 428/325; 428/328; 428/329; 428/688; 428/689; 428/697; 428/698; 428/702; 428/704
[58] Field of Search ........................... 501/96, 99, 93, 501/102, 87; 428/688, 689, 697, 698, 702, 704, 636, 640, 657, 655, 312.6, 312.8, 319.1, 325, 328, 329

[56] References Cited

U.S. PATENT DOCUMENTS

| | | | |
|---|---|---|---|
| 3,758,662 | 9/1973 | Tobin et al. | 264/332 |
| 3,864,154 | 2/1975 | Gazza et al. | 29/123 B |
| 4,050,956 | 9/1977 | de Bruin et al. | 228/193 |
| 4,055,451 | 10/1977 | Cockbain et al. | 156/89 |
| 4,471,059 | 9/1984 | Yoshino et al. | 501/96 |
| 4,585,618 | 4/1986 | Fresnel et al. | 419/12 |
| 4,595,545 | 6/1986 | Sane | 264/65 |
| 4,605,440 | 8/1986 | Halverson et al. | 75/238 |
| 4,692,418 | 9/1987 | Boecker et al. | 501/90 |
| 4,702,770 | 10/1987 | Pyzik et al. | 75/236 |
| 4,713,360 | 12/1987 | Newkirk et al. | 501/87 |
| 4,718,941 | 1/1988 | Halverson et al. | 75/236 |
| 4,763,828 | 8/1988 | Fukaya et al. | 228/124 |
| 4,777,014 | 10/1988 | Newkirk et al. | 419/12 |
| 4,834,938 | 5/1989 | Pyzik et al. | 419/6 |
| 4,875,616 | 10/1989 | Nixdorf | 228/120 |
| 4,884,737 | 12/1989 | Newkirk | 228/221 |
| 4,915,736 | 4/1990 | Claar | 75/238 |

FOREIGN PATENT DOCUMENTS

| | | |
|---|---|---|
| 0165707 | 12/1985 | European Pat. Off. . |
| 0193292 | 9/1986 | European Pat. Off. . |
| 0239520 | 9/1987 | European Pat. Off. . |
| 0262075 | 3/1988 | European Pat. Off. . |
| 1492477 | 11/1977 | United Kingdom . |

Primary Examiner—Henry F. Epstein
Assistant Examiner—Timothy M. Speer
Attorney, Agent, or Firm—Jeffrey R. Ramberg

[57] ABSTRACT

This invention relates generally to a novel method of manufacturing a composite body and to novel products made thereby. More particularly, the invention relates to a method of producing a self-supporting composite body comprising one or more boron-containing compounds, e.g., a boride or a boride and carbide, by reactive infiltration of molten parent metal into a bed or mass containing boron carbide, and, optionally, one or more inert fillers and permitting residual or excess parent metal to remain bonded to the formed self-supporting composite body. The residual or excess metal is used to form a bond between the formed composite body and another body (e.g., a metal body, a ceramic body, or another composite body). In addition, this invention related to alternative methods of disposing metal on at least one surface of the above-described composite bodies (such as sputtering, CVD, etc.) to permit the composite bodies to be bonded to another body.

19 Claims, No Drawings

MACROCOMPOSITE BODIES

CROSS REFERENCE TO RELATED APPLICATION

This is a continuation of application(s) Ser. No. 07/867,847 filed on Apr. 13, 1992, now abandoned, which was a continuation of U.S. Ser. No. 07/551,290, filed Jul. 12, 1990, and issued on Apr. 14, 1992 as U.S. Pat. No. 5,104,029, which was a continuation-in-part of U.S. Ser. No. 07/296,837, filed on Jan. 13, 1989, and now abandoned. The contents of the above-identified patent application are hereby expressly incorporated by reference.

FIELD OF THE INVENTION

This invention relates generally to a novel method of manufacturing a composite body and to novel products made thereby. More particularly, the invention relates to a method of producing a self-supporting composite body comprising one or more boron-containing compounds (e.g., a boride or a boride and carbide) by reactive infiltration of molten parent metal into a bed or mass containing, for example, boron carbide, and, optionally, one or more inert fillers, and permitting residual or excess parent metal to remain bonded to the formed self-supporting composite body. The residual or excess metal can then be used to form a bond between the formed composite body and another body (e.g., a bond between the formed composite body and a metal body, a ceramic body, or another composite body).

In addition, this invention relates to alternative methods of disposing metal on at least one surface of the above-described composite bodies (such as sputtering, CVD, etc.) to permit the composite bodies to be bonded to another body.

BACKGROUND OF THE PRESENT INVENTION

In recent years, there has been an increasing interest in the use of ceramics for structural applications historically served by metals. The impetus for this interest has been the relative superiority of ceramics, when compared to metals, with respect to certain properties, such as corrosion resistance, hardness, wear resistance, modulus of elasticity and refractory capabilities.

However, a major limitation on the use of ceramics for such purposes is the feasibility and cost of producing the desired ceramic structures. For example, the production of ceramic boride bodies by the methods of hot pressing, reaction sintering, and reaction hot pressing is well known. While there has been some limited success in producing ceramic boride bodies according to the above-discussed methods, there is still a need for a more effective and economical method to prepare dense boride-containing materials.

In addition, a second major limitation on the use of ceramics for structural applications is that ceramics generally exhibit a lack of toughness (i.e., damage tolerance, or resistance to fracture). Such lack of toughness tends to result in sudden, easily induced, catastrophic failure of ceramics in applications involving rather moderate tensile stresses. This lack of toughness tends to be particularly common in monolithic ceramic boride bodies.

One approach to overcome the above-discussed problem has been the attempt to use ceramics in combination with metals, for example, as cermets or metal matrix composites. The objective of this known approach is to obtain a combination of the best properties of the ceramic (e.g., hardness and/or stiffness) and the best properties of the metal (e.g., ductility). While there has been some general success in the cermet area in the production of boride compounds, there still remains a need for more effective and economical methods to prepare boride-containing materials.

DISCUSSION OF RELATED PATENT APPLICATIONS

Many of the above-discussed problems associated with the production of boride-containing materials have been addressed in U.S. Pat. No. 4,885,130 (hereinafter "Patent '130"), which issued on Dec. 5, 1989, in the names of Danny R. White, Michael K. Aghajanian and T. Dennis Claar and is entitled "Process for Preparing Self-Supporting Bodies and Products Made Thereby".

Briefly summarizing the disclosure of Patent '130, self-supporting ceramic bodies are produced by utilizing a parent metal infiltration and reaction process (i.e., reactive infiltration) in the presence of a mass comprising boron carbide. Particularly, a bed or mass comprising boron carbide and, optionally, one or more of a boron donor material and a carbon donor material is infiltrated by molten parent metal, and the bed may be comprised entirely of boron carbide or only partially of boron carbide, thus resulting in a self-supporting body comprising, at least in part, one or more parent metal boron-containing compounds, which compounds include a parent metal boride or a parent metal boro carbide, or both, and typically also may include a parent metal carbide. It is also disclosed that the mass comprising boron carbide which is to be infiltrated may also contain one or more inert fillers mixed with the boron carbide. Accordingly, by combining an inert filler, the result will be a composite body having a matrix produced by the reactive infiltration of the parent metal, said matrix comprising at least one boron-containing compound, and the matrix may also include a parent metal carbide, the matrix embedding the inert filler. It is further noted that the final composite body produced in either of the above-discussed embodiments (i.e., filler or no filler) may include a residual metal as at least one metallic constituent of the original parent metal.

Broadly, in the disclosed method of Patent '130, a mass comprising boron carbide and, optionally, one or more of a boron donor material and a carbon donor material, is placed adjacent to or in contact with a body of molten parent metal or parent metal alloy, which is melted in a substantially inert environment within a particular temperature envelope. The molten parent metal infiltrates the mass comprising boron carbide and reacts with at least the boron carbide to form at least one reaction product. The boron carbide and/or the boron donor material and/or the carbon donor material is reducible, at least in part, by the molten parent metal, thereby forming the parent metal boron-containing compound (e.g., a parent metal boride and/or boro compound under the temperature conditions of the process). Typically, a parent metal carbide is also produced, and in certain cases, a parent metal boro carbide is produced. At least a portion of the reaction product is maintained in contact with the parent metal, and molten parent metal is drawn or transported toward the unreacted mass comprising boron carbide by a wicking or a capillary action. This transported metal forms additional parent metal, boride, carbide, and/or boro carbide and the formation or development of a ceramic body is continued until either the parent metal or mass comprising boron carbide has been consumed, or until the reaction temperature is altered to be outside of the reaction temperature envelope. The resulting structure comprises one or more of a parent metal boride, a parent metal boro compound, a parent metal carbide, a metal (which, as discussed in Patent '130, is intended to include alloys and intermetallics), or voids, or any combination thereof. Moreover, these several phases may or may not be interconnected in one or more dimensions throughout the body. The final volume fractions of the boron-containing compounds (i.e., boride and boron compounds), carbon-containing compounds, and metallic phases, and the degree of interconnectivity, can be controlled by changing one or more conditions, such as the initial density of the mass comprising boron carbide, the relative amounts of boron carbide and parent metal, alloys of the parent metal, dilution of the boron carbide with a filler, the amount of boron donor material and/or carbon donor material mixed with the mass comprising boron carbide, temperature, and time. Preferably, conversion of the boron carbide to the parent metal boride, parent metal boro compound(s) and parent metal carbide is at least about 50%, and most preferably at least about 90%.

The typical environment or atmosphere which was utilized in Patent '130 was one which is relatively inert or unreactive under the process conditions. Particularly, it was disclosed that an argon gas, or a vacuum, for example, would be suitable process atmospheres. Still further, it was disclosed that when zirconium was used as the parent metal, the resulting composite comprised zirconium diboride, zirconium carbide, and residual zirconium metal. It was also disclosed that when aluminum parent metal was used with the process, the result was an aluminum boro carbide such as $Al_3B_{48}C_2$, $AlB_{12}C_2$ and/or $AlB_{24}C_4$, with aluminum parent metal and other unreacted unoxidized constituents of the parent metal remaining. Other parent metals which were disclosed as being suitable for use with the processing conditions included silicon, titanium, hafnium, lanthanum, iron, calcium, vanadium, niobium, magnesium, and beryllium.

Still further, it is disclosed that by adding a carbon donor material (e.g., graphite powder or carbon black) and/or a boron donor material (e.g., a boron powder, silicon borides, nickel borides and iron borides) to the mass of boron carbide, the ratio of parent metal-boride/parent metal-carbide can be adjusted. For example, if zirconium is used as the parent metal, the ratio of $ZrB_2/ZrC$ can be reduced if a carbon donor material is utilized (i.e., more ZrC is produced due to the addition of a carbon donor material in the mass of boron carbide) while if a boron donor material is utilized, the ratio of $ZrB_2/ZrC$ can be increased (i.e., more $ZrB_2$ is produced due to the addition of a boron donor material in the mass of boron carbide). Still further, the relative size of $ZrB_2$ platelets which are formed in the body may be larger than platelets that are formed by a similar process without the use of a boron donor material. Thus, the addition of a carbon donor material and/or a boron donor material may also affect the morphology of the resultant material.

In another related patent, specifically, U.S. Pat. No. 4,915,736 (hereinafter referred to as "Patent '736"), issued in the names of Terry Dennis Claar and Gerhard Hans Schiroky, on Apr. 10, 1990, and entitled "A Method of Modifying Ceramic Composite Bodies By a Carburization Process and Articles Made Thereby", additional modification techniques are disclosed. Specifically, Patent '736 discloses that a ceramic composite body made in accordance with the teachings of, for example, Patent '130 can be modified by exposing the composite to a gaseous carburizing species. Such a gaseous carburizing species can be produced by, for example, embedding the composite body in a graphitic bedding and reacting at least a portion of the graphitic bedding with moisture or oxygen in a controlled atmosphere furnace. However, the furnace atmosphere should comprise typically, primarily, a non-reactive gas such as argon. It is not clear whether impurities present in the argon gas supply the necessary $O_2$ for forming a carburizing species, or whether the argon gas merely serves as a vehicle which contains impurities generated by some type of volatilization of components in the graphitic bedding or in the composite body. In addition, a gaseous carburizing species could be introduced directly into a controlled atmosphere furnace during heating of the composite body.

Once the gaseous carburizing species has been introduced into the controlled atmosphere furnace, the setup should be designed in such a manner to permit the carburizing species to be able to contact at least a portion of the surface of the composite body buried in the loosely packed graphitic powder. It is believed that carbon in the carburizing species, or carbon from the graphitic bedding, will dissolve into the interconnected zirconium carbide phase, which can then transport the dissolved carbon throughout substantially all of the composite body, if desired, by a vacancy diffusion process. Moreover, Patent '736 discloses that by controlling the time, the exposure of the composite body to the carburizing species and/or the temperature at which the carburization process occurs, a carburized zone or layer can be formed on the surface of the composite body. Such process could result in a hard, wear-resistant surface surrounding a core of composite material having a higher metal content and higher fracture toughness.

Thus, if a composite body was formed having a residual parent metal phase in the amount of between about 5–30 volume percent, such composite body could be modified by a post-carburization treatment to result in from about 0 to about 2 volume percent, typically about ½ to about 2 volume percent, of parent metal remaining in the composite body.

Still further, U.S. Pat. No. 5,143,870, which issued on Sep. 1, 1992, in the names of Terry Dennis Claar et al. from U.S. patent application Ser. No. 07/551,352, which is a continuation-in-part application of U.S. patent application Ser. No. 07/296,239 (now abandoned), which was is a continuation-in-part application of Patent '736 and discloses that in addition to a carburizing species, a nitriding and/or boriding species may also be utilized to result in similar modifications to the formed composite bodies.

The disclosures of each of the above-discussed Commonly Owned U.S. Patent Applications and U.S. Patents are herein expressly incorporated by reference.

SUMMARY OF THE INVENTION

The present invention has been developed in view of the foregoing and to overcome the deficiencies of the prior art. For example, the invention provides a method for bonding a metal layer to a composite body which was formed by a reactive infiltration technique (herein sometimes referred to as "reactively infiltrated body"). Particularly, the metal layer may be provided by any technique which supplies a thickness of metal sufficient to bond the two bodies. For example, the metal layer may be deposited (e.g., sputtering, CVD, etc.) on the first body and/or applied as a coating (e.g., a slurry of powdered metals or alloys). Further, the metal layer in turn can be bonded to a second body such as a ceramic body and/or a metal body and/or another composite body. The second body may be another ceramic body made by a similar technique or by a completely different technique.

Moreover, the second body could be a metal having a substantially similar or substantially different chemical composition from the metal bonded to the reactively infiltrated body.

In a first embodiment, the bonding is effected by utilizing a supply of molten parent metal which exceeds that amount of parent metal necessary to achieve substantially complete reactive infiltration of the mass comprising, for example, boron carbide which is to be infiltrated. For example, a reservoir of parent metal may be positioned adjacent to the mass to be infiltrated to supply the desired quantity (e.g., an excess) of parent metal. Further, a reservoir may be utilized to supply a parent metal alloy and/or a second parent metal which has a composition different from a first parent metal. Thus, when such excess molten parent metal is present, the resultant body will be a complex composite body, wherein the body which has been produced by reactive infiltration will be directly bonded to excess parent metal. Moreover, the reactively infiltrated body may be formed either as an exterior and/or an interior surface on a substrate of the metal, and the relative thicknesses of the metal to the reactively infiltrated body can be varied. Accordingly, thick-walled or thin-walled metals and/or reactively infiltrated bodies can be formed.

In a second method for bonding metal to a reactively infiltrated body, a body is first formed in accordance with the teachings of, for example, Patent '130. Such a reactively infiltrated body has a particular affinity for a metal which is similar to, and in some cases substantially different from, that metal which was used as the parent metal during the reactive infiltration process. Due to the affinity of such a metal to a formed body, the metal may be made molten and contacted with at least a surface of the reactively infiltrated body, thereby resulting in a direct bonding between the metal and the reactively infiltrated body. In this second embodiment, a macrocomposite can also be formed wherein the metal is bonded to another ceramic body or another metal body. Accordingly, the present invention provides a method of forming macrocomposite bodies (e.g., the bonding of two bodies together of similar and/or different compositions).

DETAILED DESCRIPTION OF THE INVENTION AND PREFERRED EMBODIMENTS

In accordance with the invention, a self-supporting body is produced by the reactive infiltration of a molten parent metal with a boron and/or a carbon containing material (e.g., boron carbide) to form a polycrystalline ceramic-containing body comprising the reaction product(s) of the parent metal with boron carbide, and also may include one or more constituents of the parent metal. The boron carbide, typically a solid at the process conditions, is preferably in fine particulate or powdered form. The environment or atmosphere for the process is chosen to be relatively inert or nonreactive under the process conditions. Argon or vacuum, for example, would be suitable process atmospheres. The resulting product comprises one or more of (a) a parent metal boride, (b) a boro compound, (c) usually a parent metal carbide, and (d) metal (e.g., residual parent metal). Also, the self-supporting body produced may exhibit porosity or voids. The constituents and proportions in the product depend upon the choice and composition of parent metal, the reaction conditions, etc.

In the preferred embodiments of the present invention, the parent metal and a mass or bedding comprising boron carbide are positioned adjacent to each other so that reactive infiltration will be in the direction towards and into the bedding. The bedding, which may be preshaped, may include a filler material, such as a reinforcing filler, which is substantially inert under the process conditions. The reaction product can grow into the bedding without substantially disturbing or displacing it. Thus, no external forces are required which might damage or disturb the arrangement of the bedding and no awkward or costly high temperature, high pressure processes and facilities are required to create the reaction product. Reactive infiltration of the parent metal into and with the boron carbide, which preferably is in particulate or powdered form, forms a composite typically comprising a parent metal boride and a parent metal boro compound. With aluminum as the parent metal, the product may comprise an aluminum boro carbide (e.g. $Al_3B_{48}C_2$, $AlB_{12}C_2$, $AlB_{24}C_4$), and also may include metal, e.g. aluminum, and possibly other unreacted or unoxidized constituents of the parent metal. If zirconium is the parent metal, the resulting composite comprises zirconium boride and zirconium carbide. Also, zirconium metal may be present in the composite. Alternatively, if a titanium/zirconium alloy is used as the parent metal, the resulting composite comprises titanium boride, titanium carbide, zirconium boride and zirconium carbide. Additionally, some titanium/zirconium alloy may be present in the composite as residual or nonreacted parent metal.

Although the present invention is hereinafter described with particular reference to certain preferred embodiments in which the parent metal comprises zirconium or aluminum, this is for illustrative purposes only. Other patent metals also may be used such as silicon, titanium, tantalum, hafnium, lanthanum, iron, calcium, vanadium, niobium, magnesium, chromium, beryllium and titanium/zirconium alloys, and examples for several such parent metals are given below.

It should be understood that the operable temperature range or preferred temperature may not extend over the entire range of temperatures which are above the melting point of the parent metal, but below the melting point of the reaction product. The temperature range will depend upon such factors as the composition of the parent metal the desired phases in the resulting composite, etc. Molten metal contacts, for example, the boron carbide, and a parent metal boride (e.g. zirconium diboride) and a parent metal carbide (e.g., zirconium carbide) are formed as the reaction product. Upon continued exposure to the boron carbide, the remaining molten metal is progressively drawn through the reaction product in the direction of and into the mass containing the boron carbide, to provide continued formation of reaction product at the interface between the molten metal and boron carbide. The product produced by this method comprises the reaction product(s) of the parent metal with the boron carbide, or may comprise a ceramic-metal composite to include further one or more unreacted or non-oxidized constituents of the parent metal. A substantial amount of the boron carbide is reacted to form the reaction product(s), preferably this amount being at least about 50% and most preferably at least about 90%. The ceramic crystallites formed as the reaction product by the process may or may not be interconnected, but preferably are interconnected in three dimensions, and the metallic phases and any voids in the product are normally at least partially interconnected. Any porosity tends to result from a partial or nearly complete depletion of the parent metallic phase in favor of the formation of additional reaction product (as in the case where stoichiometric reactants or excess boron carbide is present), but the volume percent of voids will depend on such factors as temperature, time, type of parent metal, and the porosity of the mass of boron carbide.

It has been observed that products made in accordance with this invention using zirconium, titanium and hafnium as the parent metal form a parent metal boride characterized by a platelet-like structure. These platelets typically are unaligned or randomly oriented. This platelet-like structure and the metallic phase appear to account at least in large part for the extraordinarily high fracture toughness of this composite, about 12 megapascals meters$^{1/2}$ or higher, because of crack deflection and/or pull-out mechanisms.

In another aspect of the invention, there is provided a self-supporting body, including composite bodies, comprising a matrix of reaction product, and, optionally metallic constituents, embedding a substantially inert filler. The matrix is formed by the reactive infiltration of a parent metal into a bed or mass of the filler intimately mixed with a boron and/or a carbon containing material (e.g., boron carbide). The filler material may be of any size (e.g., a mixture of different particle sizes) or shape, and may be oriented with respect to the parent metal in any manner as long as the direction of development of the reaction product will be towards and will engulf at least a portion of the filler material without substantially disturbing or displacing it. The filler may be composed of or comprise any suitable material, such as ceramic and/or metal fibers, whiskers, particulates, powders, rods, wires, wire cloth, refractory cloth, plates, platelets, reticulated foam structure, solid or hollow spheres, etc. A particularly useful filler is alumina, but other oxides and ceramic fillers may be used depending on the starting materials and the end properties desired. The volume of filler material may be a loose or bonded array or arrangement, which array has interstices, openings, intervening spaces, or the like, to render the filler material permeable to the infiltration of molten parent metal. Further the filler material may be homogeneous or heterogeneous. If desired, these materials may be bonded with any suitable binding agent (e.g. Avicil PH 105, from FMC Co.) which does not interfere with the reactions of this invention or leave any undesirable residual by-products within the final composite product. A filler which would tend to react excessively with the boron carbide or with the molten metal during processing may be coated so as to render the filler inert to the process environment. For example, carbon fiber, if used as a filler in conjunction with aluminum as the parent metal will tend to react with molten aluminum, but this reaction can be avoided if the fiber is first coated, e.g. with alumina.

A suitable refractory container (e.g., alumina or graphite) holding the parent metal and a bed or volume of filler with admixed a boron and/or carbon containing material (e.g., boron carbide) properly oriented to permit reactive infiltration of the parent metal into the filler bed and proper development of the composite, is placed in a furnace, and this lay-up is heated to a temperature above the melting point of the parent metal. At these elevated temperatures, the molten parent metal infiltrates the permeable filler by a wicking process and reacts with the boron carbide, thereby producing the desired ceramic or ceramic-metal composite body. Moreover, to assist in reducing the amount of final machining and finishing operations, a barrier material can surround the preform. The use of a graphite mold is particularly useful as a barrier for such parent metals as zirconium, titanium, or hafnium, when used in combination with preforms made of, for example, boron carbide, boron nitride, boron and carbon. Still further, by placing an appropriate number of through-holes having a particular size and shape in the aforementioned graphite mold, the amount of porosity which typically occurs within a composite body manufactured according to the present invention, is reduced. Typically, a plurality of holes is placed in a bottom portion of the mold, or that portion of the mold toward which reactive infiltration occurs. The holes function as a venting means which permit the removal of, for example, argon gas which has been trapped in the preform as the parent metal reactive infiltration front infiltrates the preform.

Preforms for use with the present invention may be made by any of a wide range of ceramic body formation methods (such as uniaxial pressing, isostatic pressing, slip casting, sedimentation casting, spraying, dipping, extrusion, tape casting, injection molding, filament winding for fibrous materials, etc.) depending on the characteristics of the filler. Initial bonding of the filler particles, whiskers, fibers, or the like, prior to reactive infiltration may be obtained through light sintering or by use of various organic or inorganic binder materials which do not interfere with the process or contribute undesirable by-products to the finished material. The preform is manufactured to have sufficient shape integrity and green strength, and should be permeable to the transport of molten metal, preferably having a porosity of between about 5 and 90% by volume and more preferably between about 25 and 75% by volume. In the case of an aluminum parent metal, suitable filler materials include, for example, silicon carbide, titanium diboride, alumina and aluminum dodecaboride (among others), and as particulates typically having a mesh size of from about 14 to 1000, but any admixture of filler materials and mesh sizes may be used. The preform is then contacted with molten parent metal on one or more of its surfaces for a time sufficient to complete infiltration of the matrix to the surface boundaries of the preform. The result of this preform method is a ceramic-metal composite body of a shape closely or exactly representing that desired in the final product, thus minimizing or eliminating expensive final machining or grinding operations.

It has been discovered that infiltration of the permeable filler by the parent metal is promoted by the presence of a boron carbide in the filler. A small amount of boron source has been shown to be effective, but the minimum can depend upon a number of factors such as type and particle size of the boron carbide, type of parent metal, type of filler, and process conditions. Thus, a wide variation of boron carbide concentrations can be provided in the filler, but the lower the concentration of boron carbide, the higher the volume percent of metal in the matrix. When very low amounts of the boron carbide are used, e.g. one to three weight percent based on the total weight of boron carbide plus filler, the resulting matrix is interconnected metal and a limited amount of parent metal boride and parent metal carbide dispersed in the metal. In the absence of boron carbide, reactive infiltration of the filler may not occur, and infiltration may not be possible without special procedures, such as the application of external pressure to force the metal into the filler.

Because a wide range of boron carbide concentrations in the filler can be used in the process of this invention, it is possible to control or to modify the properties of the completed product by varying the concentration of boron carbide and/or the composition of the bed. When only a small amount of boron carbide is present relative to the amount of parent metal, such that the mass comprises a low density of boron carbide, the composite body or matrix properties are dominated by the properties of the parent metal, most typically ductility and toughness, because the matrix is predominantly metal (e.g., a metal matrix). Such a product may be advantageous for low or mid-range temperature applications. When a large amount of boron carbide is used, as for example when compound(s) having boron carbide particles are densely packed around a filler material or occupy a high percentage of space between constituents of the filler, the resulting body or matrix properties tend to be dominated by the parent metal boride and any parent metal carbide, in that the body or matrix would be harder or less ductile or less tough (e.g., a ceramic matrix). If the stoichiometry is closely controlled so as to achieve substantially complete conversion of the parent metal, the resulting product will contain little or no metal, which may be advantageous for high temperature applications of the product. Also, the substantially complete conversion of the parent metal could be significant especially in some high temperature applications, because the boride reaction product is more stable than boron carbide in that boron carbide will tend to react with residual or unoxidized metal, e.g. aluminum, present in the product.

Where desired, a carbon donor material (e.g., elemental carbon) may be admixed with the boron carbide bed or preform containing boron carbide and, optionally, a filler. This excess carbon, typically varying from about 5 to 10 weight percent of the total bedding, reacts with the parent metal thereby assuring substantially complete reaction of the metal. This reaction of the metal with the carbon will depend largely on the relative amount of carbon used, the type, e.g. carbon black or graphite, and crystallinity. Selection among these extreme characteristics may be highly desirable to meet the needs of different potential applications for these products. For example, by adding about 5–75, preferably about 5–50, percent by weight of carbon black to a $B_4C$ preform and reactively infiltrating the preform with a zirconium metal, the ratio of $ZrB_2/ZrC$ can be lowered (i.e., more ZrC is formed).

Also, a boron donor material (e.g., elemental or powdered boron) may be admixed with the boron carbide bed or preform. Particularly, it has been discovered that reactive infiltration may be facilitated when aluminum is used as the parent metal. Such an admixture reduces the cost of the bed relative to an all boron carbide bed, results in the formation of a product containing a boro carbide such as aluminum boro carbide which possesses certain properties comparable to aluminum boride, and prevents the formation of aluminum carbide which is unstable in the presence of moisture and therefore degrades the structural properties of the product. However, the presence of a boron donor material also serves to modify the ratio of parent metal boride/parent metal carbide. For example, when zirconium is used as the parent metal, the ratio of $ZrB_2/ZrC$ could be increased (i.e., more $ZrB_2$ is formed).

Additional variations in the characteristics and properties of the composite can be created by controlling the infiltration conditions. Variables which can be manipulated include the nature and size of the particles of boron carbide material, and the temperature and time of infiltration. For example, reactive infiltration involving large boron carbide particles and minimum exposure times at low temperatures will result in a partial conversion of the boron carbide to parent metal boron and parent metal carbon compound(s). As a consequence, unreacted boron carbide material remains in the microstructure, which may impart desirable properties to the finished material for some purposes. Infiltration involving the boron carbide particles, high temperatures and prolonged exposure times (e.g., a hold or dwell at temperature after infiltration is complete) will tend to favor substantially complete conversion of the parent metal to the parent metal boride and carbon compound(s). Preferably, conversion of the boron carbide to the parent metal boride, parent metal boro compound(s) and parent metal carbide is at least about 50%, and most preferably at least about 90%. Infiltration at high temperatures and/or a subsequent high temperature treatment may result in a strengthened metallic phase and/or densification of some of the composite constituents by a sintering process. In addition, as noted previously, the reduction of the amount of available parent metal below that necessary to form the boron and carbon compound(s) and fill the resulting interstices in the material may result in a porous body which also could have useful applications. In such a composite, porosity may vary from about 1 to 25 volume percent, and sometimes higher, depending upon the several factors or conditions enumerated above.

In each of the above-discussed embodiments, the amount of parent metal provided for reactive infiltration may be provided in amount such that the parent metal is in excess of that which is necessary to substantially completely react all the boron carbide material and/or any of the additives added thereto.

Particularly, the bonding of the formed composite may be effected by utilizing a supply of molten parent metal which exceeds that amount of parent metal necessary to achieve substantially complete reactive infiltration of the boron and/or carbon containing mass which is to be infiltrated. Thus, when such excess molten parent metal is present, the resultant body will be a complex composite body, wherein the body which has been produced by reactive infiltration will be directly bonded to excess parent metal. Moreover, the reactively infiltrated body may be formed either as an exterior and/or an interior surface on a substrate of the metal, and the relative thicknesses of the metal to the reactively infiltrated body can be varied. Accordingly, thick-walled or thin-walled metals and/or reactively infiltrated bodies can be formed.

In a second embodiment for bonding metal to a reactively infiltrated body, a body is first formed in accordance with the teachings of, for example, Patent '130. Such a reactively infiltrated body has a particular affinity for a metal which is similar to, and in some cases substantially different from, that metal which was used as the parent metal during the reactive infiltration process. Due to the affinity of such a metal to a formed body, the metal may be made molten and contacted with at least a surface of the reactively infiltrated body, thereby resulting in a direct bonding between the metal and the reactively infiltrated body. In this second preferred embodiment, a macrocomposite can also be formed wherein the metal is bonded to another ceramic body and/or another metal body. Accordingly, the present invention provides a method of forming macrocomposite bodies (e.g., the bonding of two bodies together of similar or different compositions).

The following Example of the present invention is intended to be illustrative only of various aspects of bonding composite bodies and is not to be construed as limiting the scope of the invention.

EXAMPLE 1

The following Example demonstrates a method for forming a ceramic matrix composite body in accordance with the instant invention.

About 76 grams of methylene chloride (J. T. Baker Co., Phillipsburg, N.J.) was poured into a plastic bottle with about 0.51 grams of Dow XUS 40303.00 tertiary amide polymer ceramic binder (Dow Chemical Corp., Midland, Mich.). After the tertiary amide polymer had substantially completely dissolved in the methylene chloride, about 51 grams of TETRABOR® 1000 grit (average particle diameter of about 5 μm) boron carbide (ESK Engineered Ceramics, New Canaan, Conn.) was added to the solvent tertiary amide polymer solution. The plastic bottle was closed by securing the lid of the plastic bottle. Tape was wrapped around the lid of the plastic bottle to prevent leaking. The plastic bottle and its contents were then placed on a reciprocating shaker for about 20–30 minutes to form a sediment cast slurry. The sediment cast slurry was poured into a graphite mold, machined from Grade ATJ graphite (Union Carbide Corp., Carbon Products Division, Cleveland, Ohio). The inner cavity of the graphite mold measured about 2 inches (51 mm) long, about 2 inches (51 mm) wide, about 3.25 inches (83 mm) high and had a wall thickness of about 0.25 inch (6.4 mm). The graphite mold and its contents were then placed into a desiccating dry box and the desiccating dry box and its contents were placed into a laboratory hood. After at least 15 hours in the desiccating dry box, the graphite mold and its contents were removed from the desiccating dry box and held in the laboratory hood at about room temperature for about an hour. The graphite mold and its contents were then placed into a forced air oven set at about 40° C. for about an hour and then into a second forced air oven set at about 70° C. for about 2 hours. The graphite mold and its contents were then placed into an evacuable furnace and the evacuable furnace door was closed. After the evacuable furnace chamber was substantially evacuated, argon was introduced into the evacuable furnace chamber at a flow rate of about 2 liters per minute. After the evacuable furnace chamber had been substantially completely filled with argon, the argon flow was interrupted and the vacuum pump was once again engaged to the evacuable furnace chamber. After a vacuum was obtained within the evacuable furnace chamber for a second time, the vacuum pump was disengaged from the evacuable furnace chamber and argon was again introduced into the evacuable furnace chamber at a flow rate of about 2 liters per minute. The evacuable furnace was then heated from about room temperature to about 200° C. in about 5 hours, from about 200° C. to about 450° C. at about 20° C. per hour, from about 450° C. to about 600° C. in about 3 hours and then cooled from about 600° C. to about room temperature in about 8 hours. At about room temperature, the argon flow rate was interrupted and the furnace door was opened to reveal that the tertiary amide polymer had been burned out of the sediment cast boron carbide preform.

About 512 grams of nuclear grade zirconium sponge (Western Zirconium Co., Ogden, Utah) were placed on the boron carbide preform within the graphite mold to produce a boron carbide solid oxidant weight to parent metal weight ratio of about 0.10. About 491 grams of nuclear grade zirconium sponge (Western Zirconium Co., Ogden, Utah) were placed into a second graphite mold prepared in substantially the same manner as described above. Both molds and their contents were placed into a graphite tray to form a lay-up.

The lay-up and its contents were placed into a vacuum furnace and the vacuum furnace door was closed. The vacuum furnace chamber was evacuated and filled with argon at about 10 liters per minute. Once the vacuum furnace chamber was substantially completely filled with argon, the argon flow rate was interrupted and the vacuum furnace chamber was once again evacuated. The vacuum pump was then disengaged and the argon was again introduced into the vacuum furnace chamber at about 10 liters per minute until an overpressure of about 2 pounds per square inch (0.14 kg/cm$^2$) was attained, then the argon flow rate was reduced to about 2 liters per minute. The vacuum furnace and its contents were then heated from about room temperature to about 1900° C. in about 13 hours, held at about 1900° C. for about 2 hours, cooled from about 1900° C. to about 1500° C. in about 8 hours and from about 1500° C. to about room temperature in about 8 hours, while maintaining an argon flow rate of about 2 liters per minute at an overpressure of about 2 pounds per square inch (0.14 kg/cm$^2$). At about room temperature, the argon flow rate was interrupted and the vacuum furnace door was opened to reveal that the zirconium parent metal had reactively infiltrated the boron carbide solid oxidant to form a ceramic matrix composite body. After the graphite mold had been removed and any residual pieces of the graphite mold attached to the ceramic matrix composite body had been removed by sandblasting, it was noted that a carcass of zirconium parent metal was attached to the top of the ceramic matrix composite body, thereby forming a macrocomposite comprised of the zirconium carbide-zirconium diboride-zirconium metal composite attached to the zirconium parent metal carcass.

While the present invention has been disclosed in its preferred embodiments, it is to be understood that the invention is not limited to the precise disclosure contained herein, but may otherwise be embodied in various changes, modifications, and improvements which may occur to those skilled in the art, without departing from the scope of the invention as defined in the appended claims.

What is claimed is:

1. A self-supporting macrocomposite body comprising a self-supporting ceramic composite body, at least one second body and at least one body consisting essentially of metal chemically bonding said second body to said ceramic composite body, said bonding arising from an affinity of said metal body for said ceramic composite body and said second body, said self-supporting ceramic composite body comprising a three-dimensionally interconnected ceramic phase extending to the boundaries of said ceramic composite body, said ceramic phase comprising at least one carbide selected from the group consisting of a carbide of zirconium, a carbide of titanium, and a carbide of hafnium, and said ceramic composite body further comprising a boride of the metal corresponding to said carbide, said boride having a platelet structure.

2. The macrocomposite body of claim 1, wherein said self-supporting ceramic composite body further comprises at least one metal phase selected from the group consisting of zirconium, titanium and hafnium.

3. The macrocomposite body of claim 2, wherein said at least one metal body has the same chemical composition as said metal phase of said self-supporting ceramic composite body.

4. The macrocomposite body of claim 2, wherein at least a portion of said at least one metal body has a different chemical composition from said metal phase of said self-supporting ceramic composite body.

5. The macrocomposite body of claim 1, further comprising a filler material embedded by said ceramic phase.

6. The macrocomposite body of claim 1, wherein said self-supporting ceramic composite body further comprises boron carbide.

7. The macrocomposite body of claim 1, wherein said at least one second body comprises at least one body selected from the group consisting of a ceramic body, a metal body, a ceramic matrix composite body and a metal matrix composite body.

8. The macrocomposite body of claim 1, wherein said at least one second body comprises at least one body having the same composition as said self-supporting ceramic composite body.

9. The macrocomposite body of claim 1, wherein said at least one second body comprises at least one metal body having the same chemical composition as said at least one metal body bonding said self-supporting ceramic composite body to said at least one second body.

10. The macrocomposite body of claim 1, wherein said at least one second body comprises at least one metal body having a different chemical composition from said at least one metal body bonding said self-supporting ceramic composite body to said at least one second body.

11. The macrocomposite body of claim 1, wherein said at least one metal body is thin relative to any dimension of said self-supporting ceramic composite body.

12. The macrocomposite body of claim 1, wherein said at least one second body comprises at least one body having a different chemical composition than said self-supporting ceramic composite body.

13. The self-supporting macrocomposite body of claim 1, wherein said metal body comprises zirconium and said self-supporting ceramic composite body comprises zirconium carbide and zirconium diboride.

14. The self-supporting macrocomposite body of claim 1, wherein said bonding arises solely from said affinity of said metal body for said ceramic composite body.

15. A self-supporting macrocomposite body comprising a self-supporting ceramic composite body chemically bonded to at least one body consisting essentially of metal said bonding arising from an affinity of said metal body for said ceramic composite body, said self-supporting ceramic composite body comprising a three-dimensionally interconnected ceramic phase extending to the boundaries of said ceramic composite body, said ceramic phase comprising at least one nitride of a metal selected from the group consisting of titanium, zirconium and hafnium, and said ceramic composite body further comprising a boride of the metal corresponding to said nitride, said boride having a platelet structure.

16. The macrocomposite body of claim 15, produced by a method comprising:

reactively infiltrating a mass comprising boron nitride with a molten parent metal, said reactive infiltration occurring in a substantially inert atmosphere to result in a reaction of said mass with said parent metal to form at least one parent metal boron-containing compound in a ceramic composite body; and disposing at least one metal layer of said at least one metal body on at least a portion of at least one surface of said ceramic composite body, thereby forming a self-supporting macrocomposite body.

17. The macrocomposite body of claim 16, wherein said at least one metal body comprises additional parent metal.

18. The macrocomposite body of claim 15, further comprising at least one second body bonded to at least a portion of said metal body.

19. The macrocomposite body of claim 18, wherein said at least one second body comprises at least one metal body having a different chemical composition than said at least one metal body bonding said self-supporting ceramic composite body to said at least one second body.

* * * * *